(12) United States Patent
Saito et al.

(10) Patent No.: US 11,756,702 B2
(45) Date of Patent: Sep. 12, 2023

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/949,476

(22) Filed: Sep. 21, 2022

(65) Prior Publication Data

US 2023/0099209 A1 Mar. 30, 2023

(30) Foreign Application Priority Data

Sep. 24, 2021 (JP) ................................ 2021-155999

(51) Int. Cl.
*H02G 3/04* (2006.01)
*H01B 7/00* (2006.01)
*B60R 16/02* (2006.01)

(52) U.S. Cl.
CPC ....... *H01B 7/0045* (2013.01); *B60R 16/0215* (2013.01); *H02G 3/0418* (2013.01); *H02G 3/0468* (2013.01)

(58) Field of Classification Search
CPC ............ B60R 16/0207; B60R 16/0215; H02G 3/0418; H02G 3/0468; H02G 3/0481; H02G 3/32; H01B 7/0045
See application file for complete search history.

(56) References Cited

U.S. PATENT DOCUMENTS

| 7,278,190 | B2 * | 10/2007 | Fischer | F16L 3/223 |
| | | | | 248/74.2 |
| 9,482,369 | B2 * | 11/2016 | Sampson | F16L 3/127 |
| 2007/0128929 | A1 * | 6/2007 | Oga | F16L 3/1025 |
| | | | | 439/578 |
| 2009/0166480 | A1 * | 7/2009 | Sakata | H02G 3/0691 |
| | | | | 248/71 |
| 2014/0196929 | A1 | 7/2014 | Okuhara | |
| 2017/0133827 | A1 * | 5/2017 | Sugino | H05K 9/0098 |
| 2019/0049142 | A1 * | 2/2019 | Balakrishna | F24F 13/22 |

FOREIGN PATENT DOCUMENTS

| FR | 2880211 A1 * | 6/2006 | ............ F16L 3/1025 |
| JP | 2009038899 A * | 2/2009 | ............... H02G 3/30 |
| JP | 2013-055760 A | 3/2013 | |

* cited by examiner

*Primary Examiner* — Paresh Paghadal
(74) *Attorney, Agent, or Firm* — Oliff PLC

(57) ABSTRACT

A wire harness including a wire harness main body that includes an electric wire and an exterior tube that encloses an outer circumferential surface of the electric wire; a path restricting member that is attached to an outer circumferential surface of the exterior tube and restricts a path of the wire harness main body; and an attaching member that is attached to an outer circumferential surface of a connecting portion of the path restricting member.

10 Claims, 7 Drawing Sheets

WIRE HARNESS

BACKGROUND

The present disclosure relates to a wire harness.

Conventionally, a wire harness that includes: a wire harness main body that includes an electric wire member and an exterior member that covers the electric wire member; and a path restricting member that is attached to an outer circumferential surface of the exterior member and is configured to restrict the path of the wire harness main body, has been known as a wire harness for a vehicle (for example, see JP 2013-55760A).

SUMMARY

Regarding the above wire harness, there is demand for an improvement in the positional accuracy of the path restricting member with respect to other members such as the exterior member.

An exemplary aspect of the disclosure provides a wire harness that is capable of improving the positional accuracy of a path restricting member.

A wire harness according to the present disclosure includes: a wire harness main body that includes an electric wire and an exterior tube that encloses an outer circumferential surface of the electric wire; a path restricting member that is attached to an outer circumferential surface of the exterior tube and restricts a path of the wire harness main body; and an attaching member that is attached to an outer circumferential surface of a connecting portion of the path restricting member, wherein: the path restricting member includes a first main body that covers a portion of the outer circumferential surface of the exterior tube, and a first insertion port that is open in a direction orthogonal to a lengthwise direction of the first main body and extends over a full length of the first main body in a lengthwise direction of the first main body, the attaching member includes a cover that covers the outer circumferential surface of the connecting portion, the connecting portion includes a first engagement that is provided in the first main body, and the cover includes a second engagement that engages with the first engagement in a circumferential direction of the wire harness main body.

A wire harness according to the present disclosure achieves the effect of improving the positional accuracy of the path restricting member.

DETAILED DESCRIPTION OF EMBODIMENTS

Description of Embodiments of Present Disclosure

Figure 1:
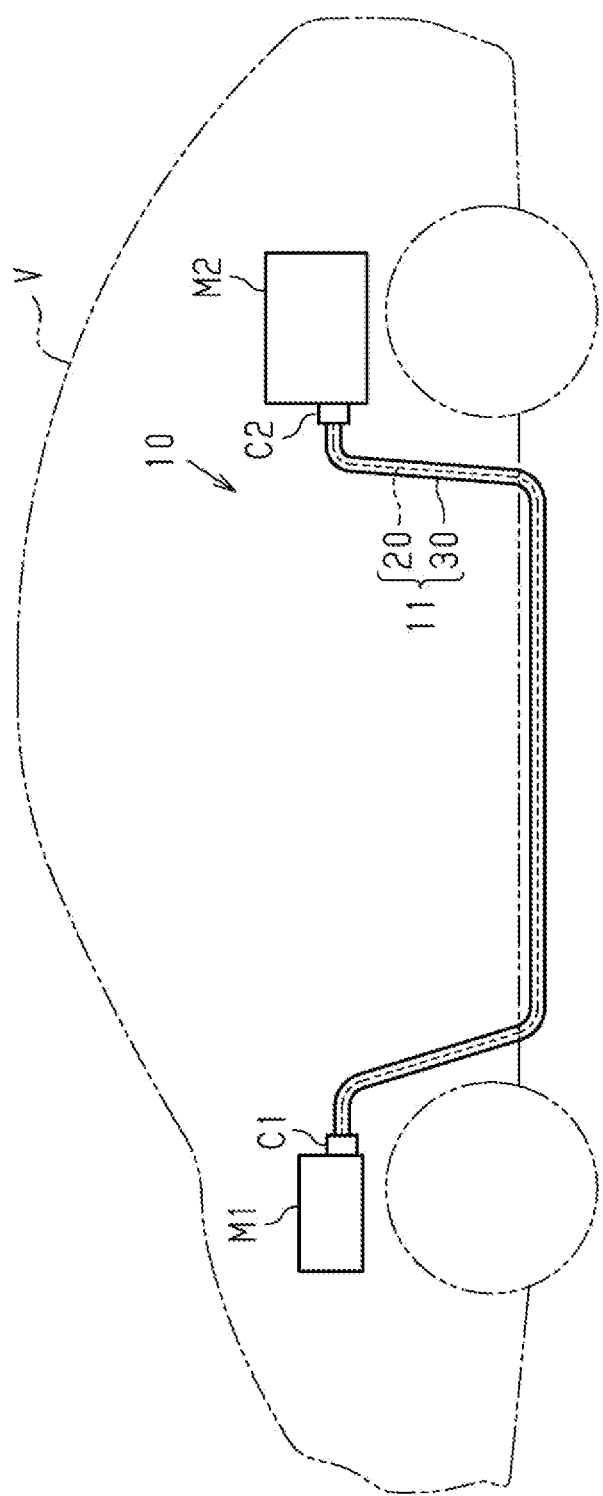
FIG. 1 is a schematic configuration diagram showing a wire harness according to a first embodiment.

First, embodiments of the present disclosure will be listed and described.

[1] A wire harness according to the present disclosure includes: a wire harness main body that includes an electric wire member and an exterior member that encloses an outer circumferential surface of the electric wire member; a path restricting member that is attached to an outer circumferential surface of the exterior member and restricts a path of the wire harness main body; and an attaching member that is attached to an outer circumferential surface of a connecting portion of the path restricting member, in which the path restricting member includes a first main body portion that covers a portion of the outer circumferential surface of the exterior member, and a first insertion portion that is open in a direction orthogonal to a lengthwise direction of the first main body portion and extends over a full length of the first main body portion in the lengthwise direction thereof, the attaching member includes a covering portion that covers the outer circumferential surface of the connecting portion, the connecting portion includes a first engaging portion that is provided in the first main body portion, and the covering portion includes a second engaging portion that engages with the first engaging portion in a circumferential direction of the wire harness main body.

With this configuration, the connecting portion of the path restricting member and the covering portion of the attaching member are provided so as to overlap each other in the lengthwise direction of the wire harness main body. Here, the first main body portion of the connecting portion is provided with the first engaging portion, and the covering portion is provided with the second engaging portion that engages with the first engaging portion in the circumferential direction of the wire harness main body. As a result of the first engaging portion and the second engaging portion engaging with each other, the path restricting member is prevented from moving in the circumferential direction of the wire harness main body relative to the attaching member. That is to say, as a result of the first engaging portion and the second engaging portion engaging with each other, the path restricting member is prevented from rotating in the circumferential direction with respect to the attaching member. Therefore, it is possible to prevent the path restricting member from being displaced in the circumferential direction of the wire harness main body with respect to the attaching member, and it is possible to improve the positional accuracy of the path restricting member with respect to the attaching member.

[2] It is preferable that either one of the first engaging portion and the second engaging portion is a recessed portion, and the other of the first engaging portion and the second engaging portion is a protruding portion that fits into the recessed portion through recess-protrusion fitting. With this configuration, as a result of the first engaging portion and the second engaging portion being fitted to each other through recess-protrusion fitting, the first engaging portion and the second engaging portion engage with each other in the circumferential direction of the wire harness main body. As a result, it is possible to prevent the path restricting member from moving in the lengthwise direction of the wire harness main body relative to the attaching member.

[3] It is preferable that the first engaging portion extends in a lengthwise direction of the wire harness main body, and the second engaging portion extends in the lengthwise direction of the wire harness main body. With this configuration, the first engaging portion extends in the lengthwise direction of the wire harness main body, and the second engaging portion extends in the lengthwise direction of the wire harness main body. Therefore, for example, even if the connecting portion and the covering portion are displaced relative to each other in the lengthwise direction of the wire harness main body, the first engaging portion and the second engaging portion can be desirably engaged with each other in the circumferential direction of the wire harness main body. As a result, it is possible to desirably prevent the path restricting member from moving in the circumferential direction of the wire harness main body relative to the attaching member.

[4] It is preferable that the first engaging portion extends over a full length of the connecting portion in a lengthwise direction thereof, and the second engaging portion extends over a full length of the covering portion in a lengthwise direction thereof. With this configuration, the first engaging portion extends over the full length of the connecting portion in the lengthwise direction thereof, and the second engaging portion extends over the full length of the covering portion in the lengthwise direction thereof. Therefore, for example, even if the connecting portion and the covering portion are displaced relative to each other in the lengthwise direction of the wire harness main body, the first engaging portion and the second engaging portion can be desirably engaged with each other in the circumferential direction of the wire harness main body. As a result, it is possible to desirably prevent the path restricting member from moving in the circumferential direction of the wire harness main body relative to the attaching member.

[5] It is preferable that the first engaging portion is a recessed portion provided in an outer surface of the first main body portion, the second engaging portion is a protruding portion that protrudes from an inner surface of the attaching member toward the path restricting member, and that is configured to engage with the recessed portion through recess-protrusion fitting, and the recessed portion is a recessed portion that does not penetrate the first main body portion. With this configuration, the recessed portion that does not penetrate through the first main body portion and the protruding portion that is provided on the inner surface of the attaching member engage with each other through recess-protrusion fitting, and thus the recessed portion and the protruding portion engage with each other in the circumferential direction of the wire harness main body. As a result, it is possible to prevent the path restricting member from moving in the lengthwise direction of the wire harness main body relative to the attaching member.

[6] It is preferable that the path restricting member includes: a first end portion and a second end portion that are provided at two end portions of the first main body portion in a circumferential direction thereof, and define the first insertion portion; a first protruding portion that protrudes from an inner surface of at least one of the first end portion and the second end portion, and is configured to come into contact with an outer surface of the exterior member; and a second protruding portion that protrudes from an inner surface of a portion of the first main body portion where the recessed part is provided, and is configured to come into contact with the outer surface of the exterior member. With this configuration, the path restricting member includes a first protruding portion that protrudes from the inner surface of at least one of the first end portion and the second end portion, and is configured to come into contact with the outer surface of the exterior member. With the first protruding portion, it is possible to press the exterior member from the outside of the exterior member, for example. Therefore, it is possible to desirably prevent the path restricting member from becoming detached from the exterior member through the first insertion port. Also, the path restricting member is provided with the second protruding portion that protrudes from the inner surface of the first main body portion and is configured to come into contact with the outer surface of the exterior member. Therefore, it is possible to make both the first protruding portion and the second protruding portion come into contact with the outer surface of the exterior member. As a result, it is possible to prevent the path restricting member from rattling on the exterior member.

[7] It is preferable that, when the path restricting member is defined as a first path restricting member, the attaching member is a second path restricting member that is attached to the outer circumferential surface of the exterior member and restricts the path of the wire harness main body, the connecting portion is provided at an end portion of the first path restricting member in the lengthwise direction thereof, and the covering portion is provided at an end portion of the second path restricting member in a lengthwise direction thereof. With this configuration, the first path restricting member and the second path restricting member are provided so as to partially overlap each other in the lengthwise direction of the wire harness main body. Specifically, the connecting portion provided at an end portion of the first path restricting member in the lengthwise direction thereof and the covering portion provided at an end portion of the second path restricting member in the lengthwise direction thereof are provided so as to overlap each other, in the lengthwise direction of the wire harness main body. As a result of the first engaging portion provided on the connecting portion and the second engaging portion provided on the covering portion engaging with each other, the first path restricting member is prevented from moving in the circumferential direction of the wire harness main body relative to the second path restricting member. Therefore, it is possible to prevent the first path restricting member from being displaced in the circumferential direction of the wire harness main body with respect to the second path restricting member, and it is possible to improve the positional accuracy of the first path restricting member with respect to the second path restricting member.

[8] It is preferable that the first path restricting member restricts a path of a straight section that is a straight section included in the path of the wire harness main body, and the second path restricting member restricts a path of a bent section that is a bent section included in the path of the wire harness main body. With this configuration, the path of the straight section is restricted by the first path restricting member, and the path of the bent section is restricted by the second path restricting member. As a result, the path of the straight section and the path of the bent section are both prevented from being displaced from desired paths.

[9] It is preferable that the attaching member is a fixing member that includes the covering portion that encloses and holds the wire harness main body and the path restricting member, and a fixing portion that is coupled to the covering portion and is to be fixed to a vehicle body. With this configuration, the wire harness main body and the path restricting member are held by the covering portion, and the fixing portion coupled to the covering portion is fixed to the vehicle body. Therefore, it is possible to fix the wire harness main body and the path restricting member to the vehicle body by fixing the fixing portion to the vehicle body.

[10] It is preferable that the covering portion is formed in an annular shape that encloses an entirety of the outer circumferential surface of the connecting portion and an entirety of an outer circumferential surface of a portion of the exterior member to which the connecting portion is attached, in a circumferential direction, and the covering portion includes a second main body portion and a lid portion that is coupled to the second main body portion. With this configuration, while the covering portion has an annular shape, the covering portion is separated into the second main body portion and the lid portion, and therefore the attaching member that includes the covering portion can be retrofitted to the connecting portion and the exterior member. As a result, it is possible to improve the assembly workability of the wire harness.

Details of Embodiments of Present Disclosure

The following describes specific examples of a wire harness according to the present disclosure with reference to the drawings. In each drawing, for convenience of explanation, some parts of the configuration may be exaggerated or simplified. In addition, the dimensional ratio of each part may differ in each drawing. The terms "orthogonal" and "full length" in the present specification are not limited to being strictly orthogonal or a full length, but may be substantially orthogonal and a full length within the range in which the actions and effects of the embodiments can be exhibited. Also, the term "tubular" used in descriptions included in the present specification is not limited to referring to a shape with a circumferential wall that is formed so as to be continuous all the way in the circumferential direction thereof, but may refer to a tubular shape constituted by a combination of a plurality of parts, or a shape with a cutout in a portion in a circumferential direction thereof, such as a C-shape. Note that examples of a "tubular" shape include, but are not limited to, a circular shape, an ellipsoidal shape, and a polygonal shape with sharp or rounded corners. Also, the term "annular" used in descriptions included in the present specification may refer to any structure that provides a loop, a continuous shape with no ends, and a typical loop shape with a C-shaped gap. Note that examples of an "annular" shape include, but are not limited to, a circular shape, an ellipsoidal shape, and a polygonal shape with sharp or rounded corners. Also, "(to) face" in the present specification means that surfaces or members are located right in front of each other, are refers to not only cases in which the entirety of the surfaces or members are located right in front of each other, but also cases in which portions of the surfaces or members are located right in front of each other. Also, "(to) face" in the present specification means both a case in which a member different from two portions is interposed between the two portions and a case in which nothing is interposed between the two portions. It should be noted that the present disclosure is not limited to these examples, and is indicated by the scope of claims, and is intended to include all modifications within the meaning and scope equivalent to the scope of claims.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 is formed in an elongated shape so as to extend in a front-rear direction of the vehicle V, for example. The wire harness 10 is routed in the vehicle V so that, for example, an intermediate portion of the wire harness 10 in the lengthwise direction thereof passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to a motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular exterior member 30 (exterior tube) that encloses the outer circumferential surface of the electric wire member 20. The wire harness 10 has connectors C1 and C2 that are respectively attached to two end portions of the electric wire member 20. One end portion of the electric wire member 20 in the lengthwise direction thereof is connected to the inverter M1 via the connector C1, and the other end portion of the electric wire member 20 in the lengthwise direction thereof is connected to the high-voltage battery M2 via the connector C2.

Figure 2:
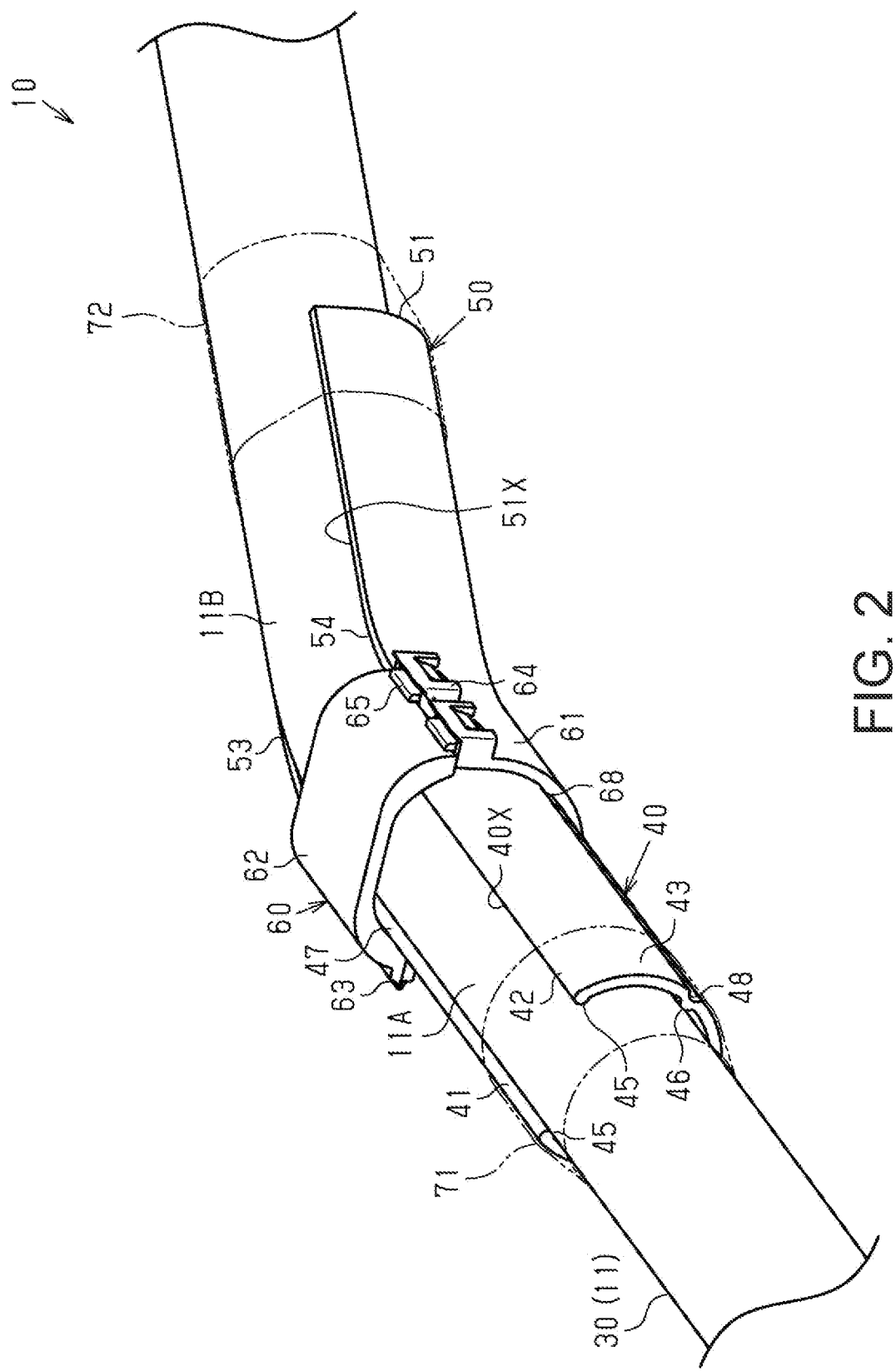
FIG. 2 is a schematic perspective view showing the wire harness according to the first embodiment.

As shown in FIG. 2, the wire harness 10 includes a first path restricting member 40 that is attached to the outer circumferential surface of the exterior member 30 and a second path restricting member 50 that is attached to the outer circumferential surface of the exterior member 30. The first path restricting member 40 and the second path restricting member 50 restrict the path along which the wire harness main body 11 is routed. Note that the first path restricting member 40 and the second path restricting member 50 are omitted from FIG. 1.

Configuration of Electric Wire Member 20

Figure 3:
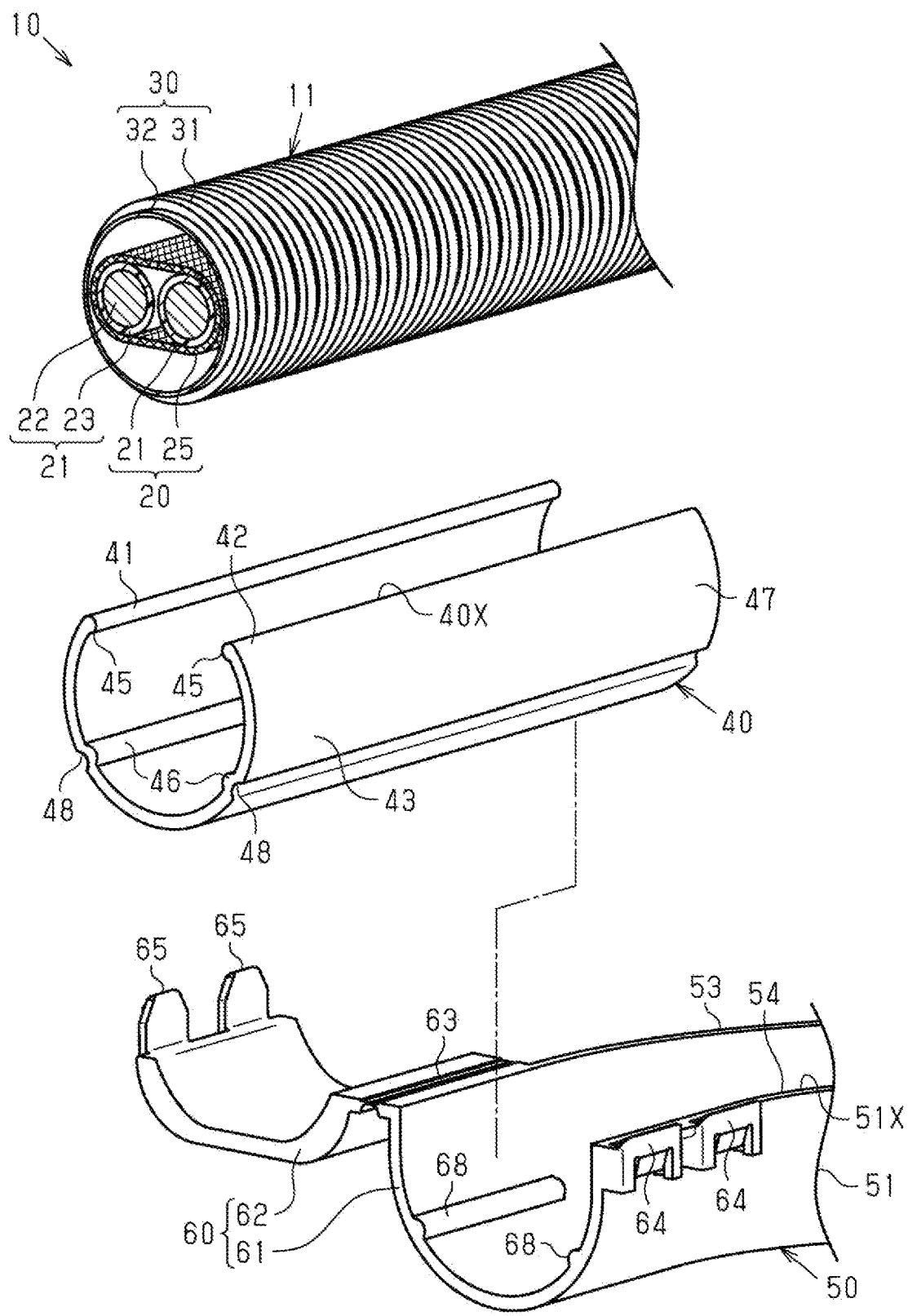
FIG. 3 is a schematic exploded perspective view showing the wire harness according to the first embodiment.
Figure 4:
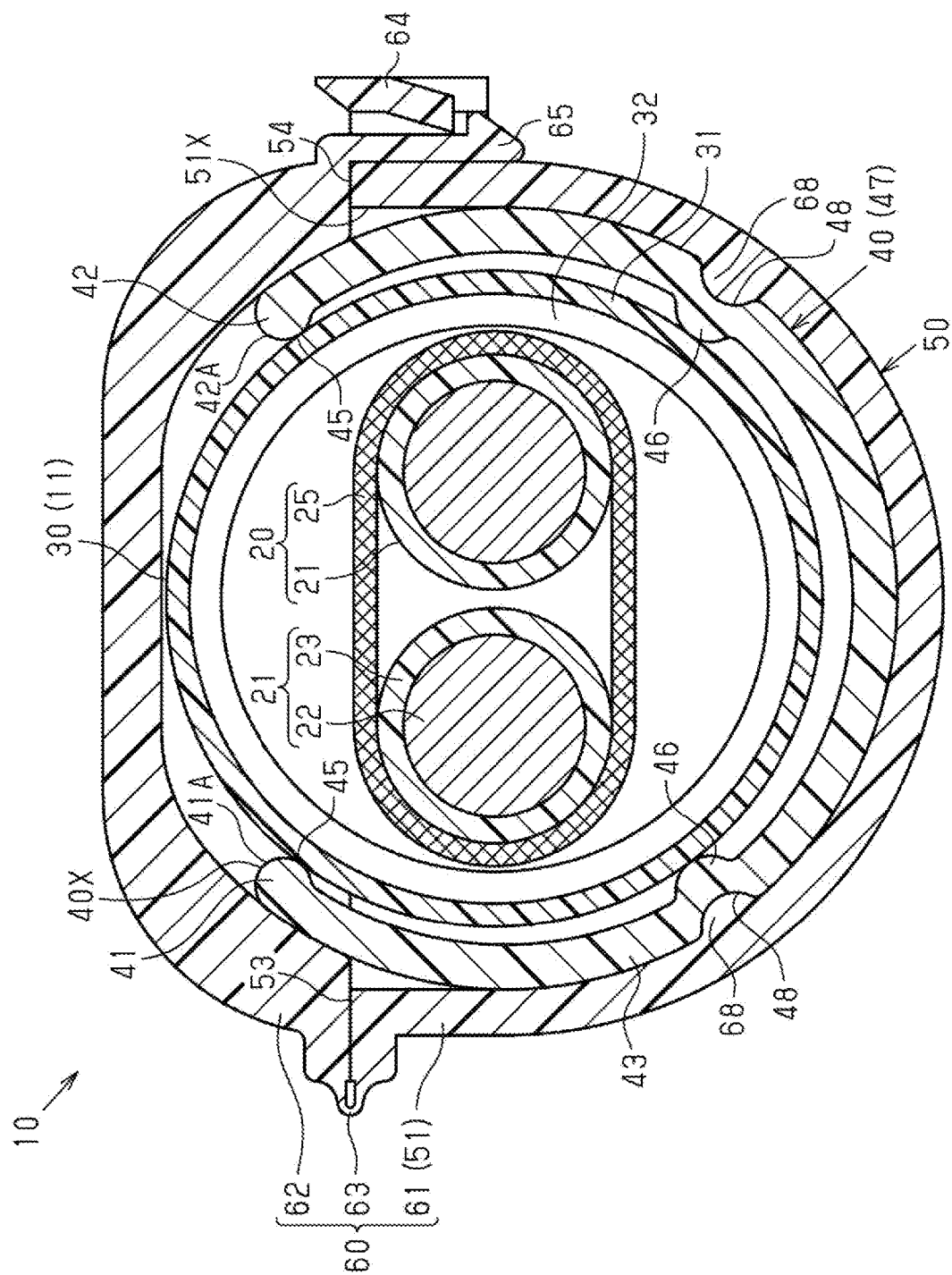
FIG. 4 is a schematic horizontal cross-sectional view showing the wire harness according to the first embodiment.

As shown in FIGS. 3 and 4, for example, the electric wire member 20 includes one or more electric wires 21 (two in the present embodiment) and a braided member 25 that collectively encloses the outer circumferential surfaces of the plurality of electric wires 21.

As shown in FIG. 4, each electric wire 21 is a coated electric wire that includes a conductive core wire 22 and an insulating coating 23 that encloses the outer circumferential surface of the core wire 22 and has insulating properties. Each electric wire 21 is, for example, a high-voltage electric wire that supports a high voltage and a large current. Each electric wire 21 may be, for example, a non-shielded electric wire that does not have an electromagnetic shield structure therewith, or a shielded electric wire that has an electromagnetic shield structure therewith. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 cut along a plane that is orthogonal to the lengthwise direction of each wire 21, i.e., the lateral cross-sectional shape of each wire 21, may be any shape. The lateral cross-sectional shape of each electric wire 21 may be, for example, a circular shape, a semicircular shape, a polygonal shape, a square shape, a flat shape, or the like. The lateral cross-sectional shape of each electric wire 21 in the present embodiment is a circular shape.

The braided member 25 has, for example, a tubular shape that collectively encloses the outer circumferential surfaces of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

As shown in FIG. 3, the exterior member 30 has a tubular shape that encloses all the way around the outer circumferential surface of the electric wire member 20. The exterior member 30 in the present embodiment is formed in a cylindrical shape. The exterior member 30 is, for example, sealed all the way around the circumferential surface of the exterior member 30. The exterior member 30 has, for example, a function of protecting the electric wire member 20 from flying objects and water droplets.

The exterior member 30 is, for example, flexible and easy to bend. Examples of the flexible exterior member 30 include a resin corrugated tube and a rubber waterproof cover. The exterior member 30 in the present embodiment is a resin corrugated tube that has a bellowed structure in which annular protrusions 31 and annular recesses 32 are alternatingly provided in the lengthwise direction of the exterior member 30. The annular protrusions 31 and the annular recesses 32 each have an annular shape that extends around the exterior member 30 in the circumferential direction thereof, for example. As the material of the exterior member 30, a synthetic resin such as polyolefin, polyamide, polyester, or an ABS resin may be used, for example. In FIGS. 1 and 2, the exterior member 30 is shown in a simplified manner.

Configurations of First Path Restricting Member 40 and Second Path Restricting Member 50

As shown in FIG. 2, the first path restricting member 40 and the second path restricting member 50 each hold the exterior member 30. The first path restricting member 40 and the second path restricting member 50 are each more rigid than the exterior member 30, for example. Compared to the outer member 30, the first path restricting member 40 and the second path restricting member 50 are each more rigid so as to be less bendable in a direction orthogonal to the lengthwise direction of the wire harness main body 11. For example, the first path restricting member 40 and the second path restricting member 50 each assist the exterior member 30 so that the wire harness main body 11 does not bend under its own weight or the like and does not deviate from a desired path. The first path restricting member 40 and the second path restricting member 50 are each provided along a portion of the wire harness main body 11 in the lengthwise direction thereof. Note that one or more first path restricting members 40 and one or more second path restricting members 50 may be provided depending on the path of the wire harness main body 11.

For example, the first path restricting member 40 is attached to the outer circumferential surface of the exterior member 30 along a straight section 11A, which is a straight section of the path of the wire harness main body 11. The first path restricting member 40 restricts the path of the wire harness main body 11 in the straight section 11A. Here, the straight section 11A is a section in which the path of the wire harness main body 11 extends straight in one direction. For example, the second path restricting member 50 is attached to the outer circumferential surface of the exterior member 30 along a bent section 11B, which is a bent section of the path of the wire harness main body 11. The second path restricting member 50 restricts the path of the wire harness main body 11 in the bent section 11B. Here, the bent section 11B is a section in which the path of the wire harness main body 11 is bent two-dimensionally or three-dimensionally.

Configuration of First Path Restricting Member 40

As shown in FIG. 4, the first path restricting member 40 covers a portion of the outer circumferential surface of the exterior member 30 in the circumferential direction of the exterior member 30. The first path restricting member 40 has a tubular shape that covers a portion of the outer circumferential surface of the exterior member 30 in the circumferential direction of the exterior member 30. For example, the first path restricting member 40 covers a range larger than half of the outer circumferential surface of the exterior member 30. The first path restricting member 40 has a C-like horizontal cross-sectional shape as a whole. For example, the horizontal cross-sectional shape of the first path restricting member 40 is uniform over the entirety of the first path restricting member 40 in the lengthwise direction thereof. As shown in FIG. 2, for example, the first path restricting member 40 extends along the path in the straight section 11A, and is formed in a shape that extends straight in one direction.

The first path restricting member 40 is made of metal or resin, for example. The first path restricting member 40 in the present embodiment is made of resin. As the material of the first path restricting member 40, a synthetic resin such as polypropylene, polyamide, or polyacetal may be used, for example. The first path restricting member 40 may be manufactured using extrusion molding, injection molding, or the like, for example.

The first path restricting member 40 has a first insertion port 40X that is open in a direction orthogonal to the lengthwise direction of the first path restricting member 40. The first path restricting member 40 includes a first end portion 41 and a second end portion 42 that are two end portions of the first path restricting member 40 in the circumferential direction thereof and define the first insertion port 40X. The first path restricting member 40 includes a first main body portion 43 (first main body) that couples the first end portion 41 and the second end portion 42 to each other. In other words, the first path restricting member 40 includes the first main body portion 43 that is formed so as to cover a portion of the exterior member 30 in the circumferential direction thereof, the first end portion 41 and the second end portion 42 that are provided at two end portions of the first main body portion 43, and the first insertion port 40X that is defined by the first end portion 41 and the second end portion 42.

As shown in FIG. 4, the first main body portion 43 constitutes a main portion of the first path restricting member 40. The thickness of the first main body portion 43 in a radial direction is uniform in the circumferential direction of the first path restricting member 40, for example. The horizontal cross-sectional shape of the first main body portion 43 is a shape that matches the outer surface of the exterior member 30. For example, the first end portion 41, the second end portion 42, and the first main body portion 43 each have an arc-like horizontal cross-sectional shape.

The first end portion 41 and the second end portion 42 are provided opposite to each other in the circumferential direction of the first main body portion 43. The first end portion 41 and the second end portion 42 are separated from each other in the circumferential direction of the first main body portion 43 with the first insertion port 40X being interposed therebetween. In other words, the gap between the first end portion 41 and the second end portion 42 in the circumferential direction of the first path restricting member 40 is provided as the first insertion port 40X. As described above, the first path restricting member 40 is formed in a C shape that has the first insertion port 40X in a portion of the first main body portion 43 in the circumferential direction thereof.

The first end portion 41 includes a first leading end 41A. The second end portion 42 includes a second leading end 42A. The leading ends 41A and 42A define the first insertion port 40X. The leading ends 41A and 42A are formed in a curved shape when seen in the lengthwise direction of the first path restricting member 40. That is to say, the leading ends 41A and 42A each have a curved horizontal cross-sectional shape. The leading ends 41A and 42A in the present embodiment each have a semicircular horizontal cross-sectional shape.

For example, the first path restricting member 40 includes first protruding portions 45 (protrusion) that respectively protrude from the inner surfaces of the first end portion 41 and the second end portion 42. The first protruding portions 45 each protrude toward the exterior member 30 inserted into the first path restricting member 40, and can come into contact with the outer surface of the exterior member 30. For example, the first protruding portions 45 each come into contact with the outer surface of one of the annular protrusions 31 of the exterior member 30. The two first protruding portions 45 respectively protrude from the inner surfaces of the leading ends 41A and 42A. For example, the first protruding portions 45 each have a curved horizontal cross-sectional shape. The first protruding portions 45 in the present embodiment each have a semicircular horizontal cross-sectional shape. The first protruding portions 45 extend in the lengthwise direction of the first path restricting member 40. For example, the first protruding portions 45 each extend over the full length of the first path restricting member 40 in the lengthwise direction thereof.

For example, the first path restricting member 40 is provided with one or more (two in the present embodiment) second protruding portions 46 (second protrusions) that protrude from the inner surface of the first main body portion 43. The second protruding portions 46 each protrude from the inner surface of the first main body portion 43 toward the exterior member 30, and can come into contact with the outer surface of the exterior member 30. For example, the second protruding portions 46 each come into contact with the outer surface of one of the annular protrusions 31 of the exterior member 30. The two second protruding portions 46 are provided at intervals in the circumferential direction of the first path restricting member 40. The second protruding portions 46 each have a curved horizontal cross-sectional shape. The second protruding portions 46 in the present embodiment each have a semicircular horizontal cross-sectional shape. For example, the second protruding portions 46 each extend over the full length of the first path restricting member 40 in the lengthwise direction of the first path restricting member 40.

For example, the first protruding portions 45 and the second protruding portions 46 each press the exterior member 30 from the outside of the exterior member 30. For example, the exterior member 30 is elastically held by the first protruding portions 45 and the second protruding portions 46. As a result, the first path restricting member 40 is firmly coupled to the exterior member 30. Therefore, the first path restricting member 40 attached to the outer circumferential surface of the exterior member 30 is prevented from moving in the lengthwise direction of the exterior member 30.

The first protruding portions 45 and the second protruding portions 46 come into contact with the outer surface of the exterior member 30, and therefore, a gap is formed between the inner surface of the first main body portion 43 and the outer surface of the exterior member 30. This gap extends over the full length of the first path restricting member 40 in the lengthwise direction thereof.

The opening width of the first insertion port 40X, i.e., the shortest distance between the first end portion 41 and the second end portion 42, is smaller than the outer diameter of the exterior member 30, for example. As shown in FIG. 3, the first insertion port 40X extends over the full length of the first main body portion 43 in the lengthwise direction, in the lengthwise direction of the first main body portion 43. That is to say, the first insertion port 40X is formed so as to be open in a direction orthogonal to the lengthwise direction of the first main body portion 43, and so as to be open at the two ends of the first main body portion 43 in the lengthwise direction thereof.

As a result of inserting the exterior member 30 into the first insertion port 40X in a direction orthogonal to the lengthwise direction of the first path restricting member 40, the first path restricting member 40 elastically deforms and the opening width of the first insertion port 40X increases. When the exterior member 30 is inserted into the first path restricting member 40, the first path restricting member 40 elastically deforms to return to the original shape thereof. As a result, the opening width of the first insertion port 40X becomes smaller than the outer diameter of the exterior member 30, and the first path restricting member 40 is attached to the outer circumferential surface of the exterior member 30.

The first path restricting member 40 includes a connecting portion 47 that is to be connected to the second path restricting member 50. For example, the connecting portion 47 is provided at an end portion of the first path restricting member 40 in the lengthwise direction thereof.

As shown in FIG. 4, the connecting portion 47 has one or more recessed portions 48 (recesses) that serve as a first engaging portion (first engagement). The connecting portion 47 in the present embodiment has two recessed portions 48. The recessed portions 48 are provided in the outer surface of the first main body portion 43 of the connecting portion 47. For example, each of the recessed portions 48 is provided in the outer surface of the portion of the first main body portion 43 where the second protruding portions 46 are provided. For example, the recessed portions 48 are located so as to overlap the second protruding portions 46 in a radial direction of the first path restricting member 40. Each recessed portion 48 is formed so as to be recessed from the outer surface of the first main body portion 43 inward in a radial direction of the first path restricting member 40. Each recessed portion 48 is a recessed portion that does not penetrate through the first main body portion 43 in a radial direction thereof. The recessed portions 48 each have a curved horizontal cross-sectional shape. The recessed portions 48 in the present embodiment each have a semicircular horizontal cross-sectional shape. For example, as shown in FIG. 3, the recessed portions 48 each extend in the lengthwise direction of the wire harness main body 11. For example, the recessed portions 48 each extend in the full length of the connecting portion 47 in the lengthwise direction thereof. For example, the recessed portions 48 each extend in the full length of the first main body portion 43 in the lengthwise direction thereof.

Configuration of Second Path Restricting Member 50

As shown in FIG. 2, the second path restricting member 50 is bent along the shape of the bent section 11B. The second path restricting member 50 is made of metal or resin, for example. The second path restricting member 50 in the present embodiment is made of resin. As the material of the second path restricting member 50, a synthetic resin such as polypropylene, polyamide, or polyacetal may be used, for example. The second path restricting member 50 may be manufactured using extrusion molding, injection molding, or the like, for example.

The second path restricting member 50 includes a second main body portion 51 (second main body) and a covering portion 60 (cover) that covers a portion of the first path restricting member 40 in the lengthwise direction thereof. For example, the second main body portion 51 has a bent shape extending along the path of the bent section 11B. The second main body portion 51 covers a portion of the outer circumferential surface of the exterior member 30 in the circumferential direction of the exterior member 30. For example, the second main body portion 51 covers approximately half the range of the outer circumferential surface of the exterior member 30. For example, the horizontal cross-sectional shape of the second main body portion 51 is a shape that matches the outer surface of the exterior member 30. For example, the horizontal cross-sectional shape of the second main body portion 51 is an arc shape or a U shape. For example, the second main body portion 51 has a substantially semi-cylindrical shape.

The second main body portion 51 includes a third end portion 53 and a fourth end portion 54 that are two end portions of the second main body portion 51 in the circumferential direction thereof. The second main body portion 51 includes a second insertion port 51X that is defined by the third end portion 53 and the fourth end portion 54. The second insertion port 51X is an opening between the third end portion 53 and the fourth end portion 54. The second insertion port 51X is open in a direction orthogonal to the lengthwise direction of the second main body portion 51. The second insertion port 51X extends over the full length of the second main body portion 51 in the lengthwise direction of the second main body portion 51. That is to say, the second insertion port 51X is formed so as to be open in a direction orthogonal to the lengthwise direction of the second main body portion 51, and so as to be open at the two ends of the second main body portion 51 in the lengthwise direction thereof. The opening width of the second insertion port 51X, i.e., the shortest distance between the third end portion 53 and the fourth end portion 54, is equal to the outer diameter of the first path restricting member 40, or larger than the outer diameter of the first path restricting member 40, for example. The exterior member 30 and the first path restricting member 40 are inserted into the second insertion port 51X in a direction orthogonal to the lengthwise direction of the second path restricting member 50.

For example, the covering portion 60 is provided at an end portion of the second path restricting member 50 in the lengthwise direction thereof. For example, the covering portion 60 is provided so as to overlap the connecting portion 47 in a radial direction of the exterior member 30.

As shown in FIG. 4, the covering portion 60 covers the outer circumferential surface of the connecting portion 47. For example, the covering portion 60 is formed in an annular shape that encloses the entirety of the outer circumferential surface of the connecting portion 47 and the entirety of the outer circumferential surface of the portion of the exterior member 30 to which the connecting portion 47 is attached, in the circumferential direction.

The covering portion 60 includes a covering main body portion 61 that is an end portion of the second main body portion 51 in the lengthwise direction thereof, and a lid portion 62 that is coupled to the covering main body portion 61. The covering main body portion 61 is a portion of the second main body portion 51. For example, the lid portion 62 is formed so as to be integrated with the covering main body portion 61. For example, the horizontal cross-sectional shape of the inner surface of the lid portion 62 is a shape that matches the outer surface of the exterior member 30. For example, the horizontal cross-sectional shape of the inner surface of the lid portion 62 is formed in an arc shape or an ellipsoidal arc shape. For example, the lid portion 62 is formed in a substantially semi-ellipsoidal cylinder shape.

As shown in FIG. 2, the lid portion 62 covers a portion of the second insertion port 51X of the second main body portion 51 in the lengthwise direction of the second path restricting member 50. For example, the lid portion 62 covers the second insertion port 51X only in the covering main body portion 61 in the lengthwise direction of the second main body portion 51.

As shown in FIG. 3, for example, the covering portion 60 has a hinge portion 63 that connects the covering main body portion 61 and the lid portion 62 with each other. The hinge portion 63 connects one end of the covering main body portion 61 in the circumferential direction thereof and one end of the lid portion 62 in the circumferential direction thereof, with each other. The other end of the covering main body portion 61 in the circumferential direction thereof is provided with one or more lock portions 64. The other end of the lid portion 62 in the circumferential direction thereof is provided with one or more claw portions 65.

The lid portion 62 is rotatable about the hinge portion 63, which serves as an axis, between the open position shown in FIG. 3 and the closed position shown in FIG. 2. As shown in FIG. 4, when the lid portion 62 is at the closed position, the claw portions 65 are caught on the lock portions 64. As a result, the lid portion 62 is held in the closed position. Thus, the covering main body portion 61 and the lid portion 62 are coupled to each other. In the state where the covering main body portion 61 and the lid portion 62 are coupled to each other, the covering portion 60 has an annular shape that collectively encloses the respective outer circumferential surfaces of the exterior member 30 and the connecting portion 47. At the closed position, the lid portion 62 covers the second insertion port 51X in the covering main body portion 61 and the first insertion port 40X in the connecting portion 47.

The covering portion 60 has one or more protruding portions 68 that serve as a second engaging portion (second engagement). The covering portion 60 in the present embodiment has two protruding portions 68. The protruding portions 68 are formed so as to be able to respectively engage with the recessed portions 48 in the circumferential direction of the wire harness main body 11. For example, the protruding portions 68 are provided on the inner surface of the covering main body portion 61. For example, the protruding portions 68 protrude from the inner surface of the covering main body portion 61 toward the first main body portion 43 of the connecting portion 47. For example, the protruding portions 68 are formed so as to be able to be respectively fitted into the recessed portions 48 through recess-protrusion fitting. For example, the protruding portions 68 each have a curved horizontal cross-sectional shape. For example, the protruding portions 68 each have a semicircular horizontal cross-sectional shape.

For example, as shown in FIG. 3, the protruding portions 68 each extend in the lengthwise direction of the wire harness main body 11. Each protruding portion 68 is formed so as to be longer in the lengthwise direction of the wire harness main body 11 than in the circumferential direction of the wire harness main body 11. For example, each protruding portion 68 is formed so that the size thereof in the circumferential direction of the wire harness main body 11 is twice or more as large as the size thereof in the lengthwise direction of the wire harness main body 11. For example, the protruding portions 68 each extend in the full length of the covering portion 60 in the lengthwise direction thereof. For example, the protruding portions 68 are provided only on the covering main body portion 61 of the second main body portion 51. For example, the protruding portions 68 are provided on a portion of the covering main body portion 61 in the circumferential direction thereof.

As shown in FIG. 4, when the protruding portions 68 are fitted into the recessed portions 48 through recess-protrusion fitting, the recessed portions 48 and the protruding portions 68 engage with each other in the circumferential direction of the wire harness main body 11. Specifically, when the protruding portions 68 are fitted into the recessed portions 48 through recess-protrusion fitting, the inner surfaces of the recessed portions 48 and the side surfaces of the protruding portions 68 engage with each other in the circumferential direction of the wire harness main body 11. As a result, the first path restricting member 40 and the second path restricting member 50 are less likely to move relative to each other in the circumferential direction of the wire harness main body 11. As a result, the first path restricting member 40 is prevented from rotating in the circumferential direction of the wire harness main body 11 in the second path restricting member 50. Also, when the protruding portions 68 are fitted into the recessed portions 48, the first path restricting member 40 is positioned with respect to the second path restricting member 50 in the circumferential direction of the wire harness main body 11. As a result, the orientation of the first path restricting member 40, specifically the orientation of the first insertion port 40X, is adjusted with respect to the second path restricting member 50 in the circumferential direction of the wire harness main body 11. In other words, the position of the first insertion port 40X in the first path restricting member 40 in the circumferential direction thereof is determined by the recessed portions 48 and the protruding portions 68 engaging with the recessed portions 48. In the present embodiment, when the protruding portions 68 are fitted into the recessed portions 48, the position of the first insertion port 40X in the first path restricting member 40 in the circumferential direction thereof is set so as to face toward the lid portion 62 of the covering portion 60. Here, in the state where the connecting portion 47 is fitted at a position that is inward of the covering main body portion 61, a portion of the connecting portion 47 in the circumferential direction thereof protrudes to a position that is outward (upward in the figure) of the third end portion 53 and the fourth end portion 54 of the covering main body portion 61, i.e., toward the inner surface of the lid portion 62. The first end portion 41, the second end portion 42, and the first insertion port 40X of the connecting portion 47 are located so as to protrude farther toward the inner surface of the lid portion 62 than the third end portion 53 and the fourth end portion 54 of the covering main body portion 61.

Configurations of Restricting Members 71 and 72

As shown in FIG. 2, for example, the wire harness 10 includes a restricting member 71 that restricts the first path restricting member 40 from moving with respect to the exterior member 30, and a restricting member 72 that restricts the second path restricting member 50 from moving with respect to the exterior member 30. Resin or metal band ties, caulking rings, adhesive tapes, or the like may be used as the restricting members 71 and 72, for example. The restricting members 71 and 72 in the present embodiment are pieces of adhesive tape.

For example, the restricting member 71 is formed so as to fix the end portion that is provided opposite to the connecting portion 47, of the end portions of the first path restricting member 40 in the lengthwise direction thereof, to the outer surface of the exterior member 30. For example, the restricting member 71 is wound from the end portion of the first path restricting member 40 in the lengthwise direction thereof to the exterior member 30. As a result, it is possible to prevent the first path restricting member 40 from moving in the lengthwise direction and the circumferential direction of the wire harness main body 11 with respect to the exterior member 30. For example, the restricting member 72 is formed so as to fix the end portion that is provided opposite to the covering portion 60, of the end portions of the second path restricting member 50 in the lengthwise direction thereof, to the outer surface of the exterior member 30. For example, the restricting member 72 is wound from the end portion of the second path restricting member 50 in the lengthwise direction thereof to the exterior member 30. As a result, it is possible to prevent the second path restricting member 50 from moving in the lengthwise direction and the circumferential direction of the wire harness main body 11 with respect to the exterior member 30.

Next, actions of the present embodiment will be described.

The connecting portion 47 provided at an end portion of the first path restricting member 40 in the lengthwise direction thereof and the covering portion 60 provided at an end portion of the second path restricting member 50 in the lengthwise direction thereof are provided so as to overlap each other, in the lengthwise direction of the wire harness main body 11. Here, the recessed portions 48 are provided in the first main body portion 43 of the connecting portion 47. Also, the covering portion 60 is provided with the protruding portions 68 that engage with the recessed portions 48 in the circumferential direction of the wire harness main body 11. As a result of the recessed portions 48 and the protruding portions 68 engaging with each other, the first path restricting member 40 is prevented from moving in the circumferential direction of the wire harness main body 11 relative to the second path restricting member 50.

Next, effects of the present embodiment will be described.

(1) The recessed portions 48 are provided in the first main body portion 43 of the connecting portion 47, and the protruding portions 68 that engage with the recessed portions 48 in the circumferential direction of the wire harness main body 11 are provided on the covering portion 60. With this configuration, the above-described actions are achieved, and therefore it is possible to prevent the first path restricting member 40 from rotating in the circumferential direction thereof with respect to the second path restricting member 50. As a result, it is possible to prevent the first path restricting member 40 from being displaced with respect to the second path restricting member 50 in the circumferential direction of the wire harness main body 11. Therefore, it is possible to improve the positional accuracy of the first path restricting member 40 with respect to the second path restricting member 50. Here, in the present embodiment, the second path restricting member 50 is fixed to the exterior member 30 of the wire harness main body 11 by the restricting member 72. Therefore, the second path restricting member 50 is prevented from moving in the circumferential direction of the wire harness main body 11 relative to the wire harness main body 11. Therefore, by improving the positional accuracy of the first path restricting member 40 with respect to the second path restricting member 50, it is possible to improve the positional accuracy of the first path restricting member 40 with respect to the wire harness main body 11. As a result, it is possible to desirably position the first path restricting member 40 so as to cover a desired position of the wire harness main body 11 in the circumferential direction of the wire harness main body 11.

It is possible to prevent the first path restricting member 40 from rotating in the circumferential direction of the wire harness main body 11 with respect to the second path restricting member 50. Therefore, it is possible to prevent the first path restricting member 40 from rotating due to vibrations or the like generated during the travel of the vehicle V, for example. Therefore, it is possible to prevent the first insertion port 40X that exposes a portion of the exterior member 30 in the circumferential direction thereof to the outside from being orientated in an unintended direction with respect to the circumferential direction thereof. For example, it is possible to prevent the first insertion port 40X from facing toward the ground due to vibrations or the like generated during the travel of the vehicle V. As a result, for example, it is possible to prevent the protection performance of the first path restricting member 40 that protects the exterior member 30 from flying stones or the like, from degrading, and it is possible to prevent the durability of the wire harness 10 from degrading.

(2) The first insertion port 40X of the first path restricting member 40 is open in a direction orthogonal to the lengthwise direction of the first main body portion 43, and extends over the full length of the first main body portion 43 in the lengthwise direction thereof. As a result, it is possible to attach the first path restricting member 40 to the exterior member 30 from the first insertion port 40X after performing terminal processing such as attaching the connectors C1 and C2 to the end portions of the electric wire member 20 in the lengthwise direction thereof. In this way, the first path restricting member 40 can be retrofitted. Therefore, it is possible to improve the assembly workability of the wire harness 10.

(3) The first engaging portion of the first path restricting member 40 is provided as the recessed portions 48 that do not penetrate through the first main body portion 43. Also, the second engaging portion of the second path restricting member 50 is provided as the protruding portions 68 that are fitted into the recessed portions 48 through recess-protrusion fitting. With this configuration, by fitting the protruding portions 68 into the recessed portions 48 through recess-protrusion fitting, it is possible to engage the recessed portions 48 and the protruding portions 68 with each other in the circumferential direction of the wire harness main body 11.

(4) The recessed portions 48 are formed so as to extend in the lengthwise direction of the wire harness main body 11 and so as to extend over the full length of the connecting portion 47 in the lengthwise direction thereof. Also, the protruding portions 68 are formed so as to extend in the lengthwise direction of the wire harness main body 11 and so as to extend over the full length of the covering portion 60 in the lengthwise direction thereof. With this configuration, for example, even if the connecting portion 47 and the covering portion 60 are displaced relative to each other in the lengthwise direction of the wire harness main body 11, the recessed portions 48 and the protruding portions 68 can be desirably engaged with each other in the circumferential direction of the wire harness main body 11. As a result, it is possible to desirably prevent the first path restricting member 40 from rotating in the circumferential direction thereof with respect to the second path restricting member 50.

(5) The first path restricting member 40 is provided with the first protruding portions 45 that protrude from the inner surfaces of the first end portion 41 and the second end portion 42 and that can come into contact with the outer surface of the exterior member 30. With this configuration, the exterior member 30 can be pressed by the first protruding portions 45 from the outside of the exterior member 30, for example. Therefore, it is possible to desirably prevent the first path restricting member 40 from becoming detached from the exterior member 30 through the first insertion port 40X. Also, the first path restricting member 40 is provided with the second protruding portions 46 that protrude from the inner surface of the first main body portion 43 and can come into contact with the outer surface of the exterior member 30. With this configuration, it is possible to make the first protruding portions 45 and the second protruding portions 46 come into contact with the outer surface of the exterior member 30. Therefore, it is possible to prevent the first path restricting member 40 from rattling on the exterior member 30.

(6) The first path restricting member 40 and the second path restricting member 50 are provided so as to partially overlap each other in the lengthwise direction of the wire harness main body 11. In this overlapping portion, the recessed portions 48 and the protruding portions 68 engage with each other in the circumferential direction of the wire harness main body 11. With this configuration, due to the recessed portions 48 provided in the first path restricting member 40 itself and the protruding portions 68 provided on the second path restricting member 50 itself, it is possible to prevent the first path restricting member 40 and the second path restricting member 50 from being displaced relative to each other. Therefore, the number of parts can be reduced compared with the case where another member is used to prevent the first path restricting member 40 and the second path restricting member 50 from being displaced relative to each other.

(7) The covering portion 60 is provided with the covering main body portion 61 that is a portion of the second main body portion 51 of the second path restricting member 50, and the lid portion 62 that is coupled to the covering main body portion 61. The covering portion 60 is formed in an annular shape that collectively encloses the connecting portion 47 and the exterior member 30. With this configuration, despite the covering portion 60 having an annular shape that encloses the connecting portion 47 and the exterior member 30, the covering portion 60 is separated into the covering main body portion 61 and the lid portion 62, and therefore the second path restricting member 50 including the covering portion 60 can be retrofitted to the first path restricting member 40 and the exterior member 30. As a result, it is possible to further improve the assembly workability of the wire harness 10.

Second Embodiment

Next, a second embodiment of the wire harness will be described with reference to FIGS. 5 to 7. Note that, in the present embodiment, differences from the first embodiment will be mainly described, and the same components as those in the first embodiment may be designated by the same reference numerals and a part or all of the description may be omitted.

Figure 5:
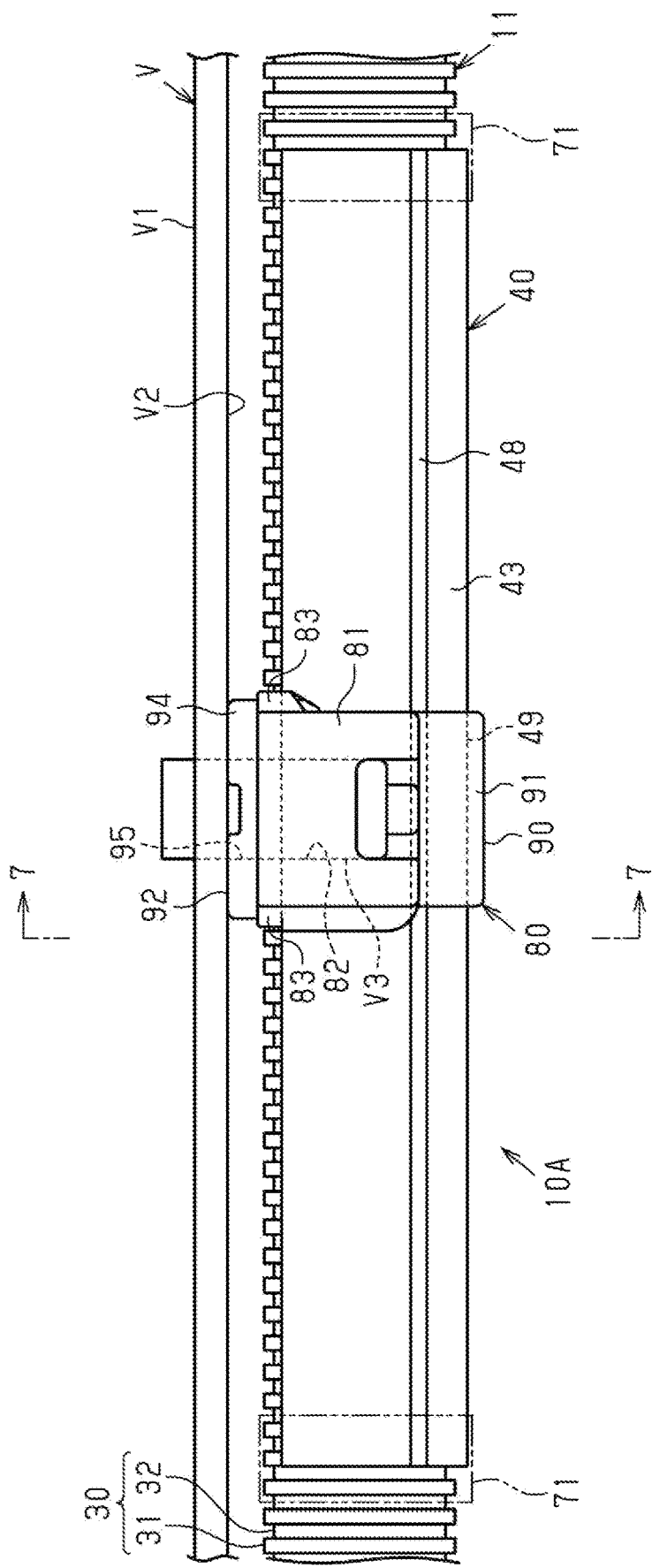
FIG. 5 is a schematic side view showing a wire harness according to a second embodiment.

As shown in FIG. 5, a wire harness 10A includes a fixing member 80 that holds the first path restricting member 40 and is fixed to a vehicle body V1 of the vehicle V. For example, the fixing member 80 holds the first path restricting member 40 attached to the exterior member 30, and is fixed to an attachment surface V2 of the vehicle body V1. The attachment surface V2 in the present embodiment is a floor surface outside the vehicle V and faces the ground. For example, the fixing member 80 is provided on an intermediate portion of the first path restricting member 40 in the lengthwise direction thereof.

Configuration of First Path Restricting Member 40

The first path restricting member 40 includes a connecting portion 49 that is connected to the fixing member 80. For example, the connecting portion 49 is provided on an intermediate portion of the first path restricting member 40 in the lengthwise direction thereof. For example, the connecting portion 49 is provided at a central position of the first path restricting member 40 in the lengthwise direction thereof. The connecting portion 49 is provided with the recessed portions 48 provided on the first main body portion 43.

Configuration of Fixing Member 80

The fixing member 80 is made of metal or resin, for example. The fixing member 80 in the present embodiment is made of resin. As the material of the fixing member 80, a synthetic resin such as polypropylene, polyamide, or polyacetal may be used, for example. The fixing member 80 may be manufactured using injection molding or the like, for example.

For example, the fixing member 80 includes a fixing portion 81 that is fixed to the vehicle body V1 and a covering portion 90 that covers the outer circumferential surface of the connecting portion 49 of the first path restricting member 40. The fixing portion 81 is coupled to the covering portion 90. The covering portion 90 encloses and holds the wire harness main body 11 and the first path restricting member 40.

Figure 6:
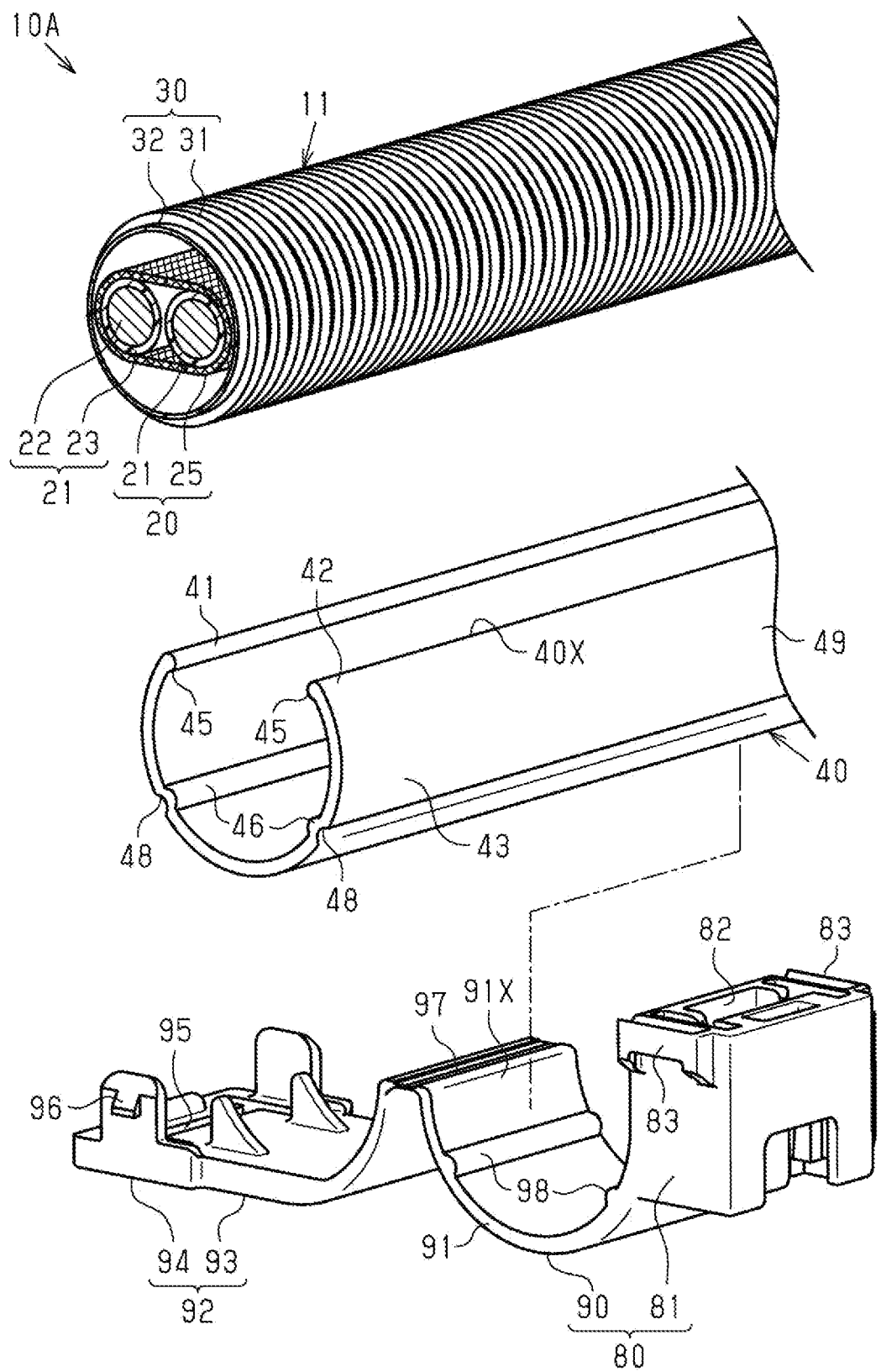
FIG. 6 is a schematic exploded perspective view showing the wire harness according to the second embodiment.

As sown in FIG. 6, in the fixing member 80, the fixing portion 81 and the covering portion 90 are arranged side by side in a direction orthogonal to the lengthwise direction of the wire harness main body 11, for example. For example, the fixing member 80 is a single part in which the fixing portion 81 and the covering portion 90 are formed integrally with each other.

For example, the fixing portion 81 is formed in a columnar shape. The fixing portion 81 in the present embodiment is formed in a square columnar shape. As shown in FIG. 5, the fixing portion 81 is provided with a fixing hole 82 that penetrates through the fixing portion 81 in a direction orthogonal to the attachment surface V2 (the top-bottom direction in the figure). The fixing portion 81 is provided with one or more (two present embodiment) lock portions 83. The two lock portions 83 are respectively provided on the two sides of the fixing hole 82 in the lengthwise direction of the wire harness main body 11.

Figure 7:
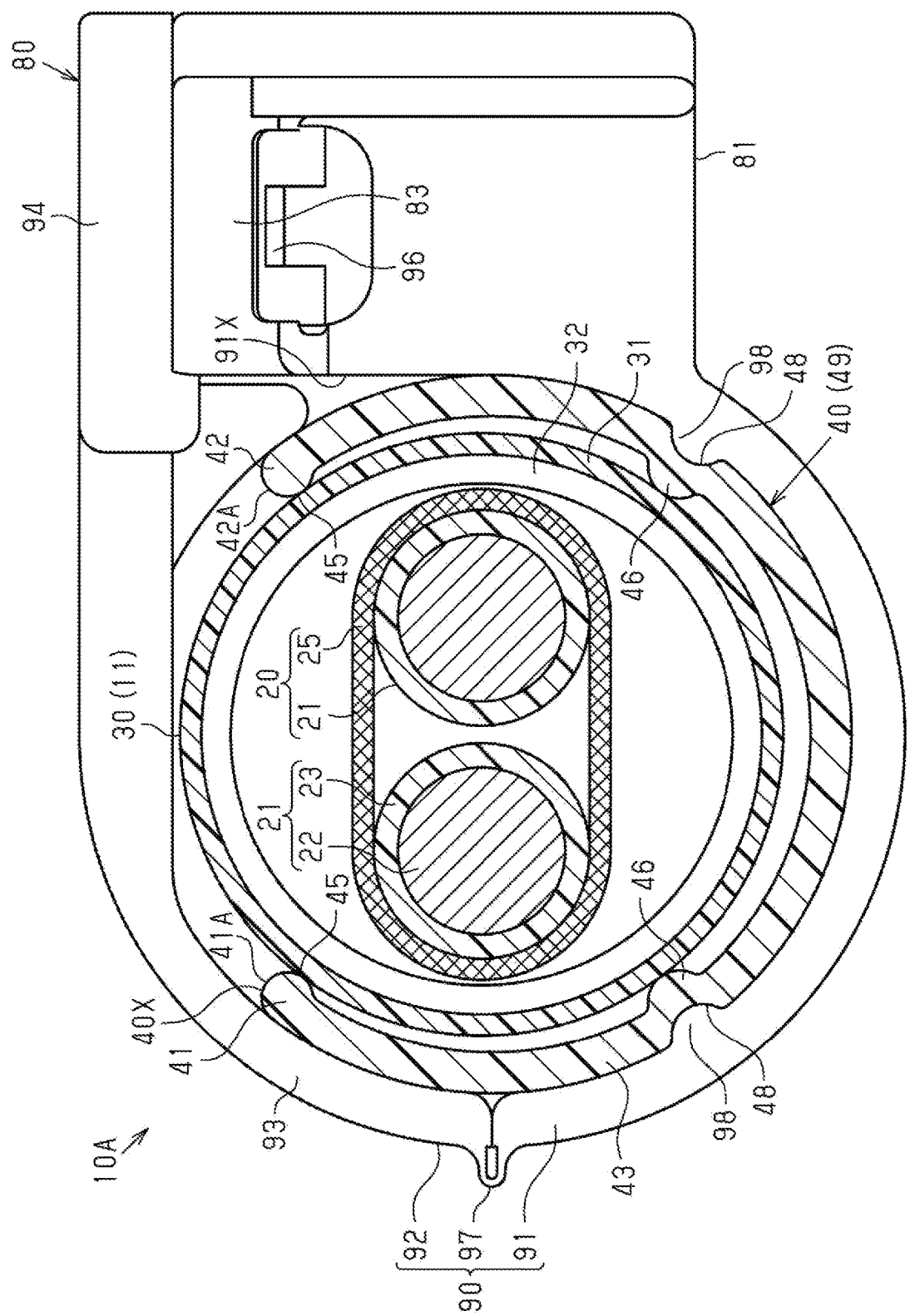
FIG. 7 is a schematic horizontal cross-sectional view (a cross-sectional view taken along the line 7-7 in FIG. 5) showing the wire harness according to the second embodiment.

As shown in FIG. 7, the covering portion 90 covers the outer circumferential surface of the connecting portion 49, for example. For example, the covering portion 90 is formed in an annular shape that encloses the entirety of the outer circumferential surface of the connecting portion 49 and the entirety of the outer circumferential surface of the portion of the exterior member 30 to which the connecting portion 49 is attached, in the circumferential direction.

For example, the covering portion 90 is provided with a second main body portion 91 and a lid portion 92. For example, the second main body portion 91 is coupled to the fixing portion 81. For example, the fixing portion 81 is formed integrally with one end of the second main body portion 91 in the circumferential direction thereof. For example, the second main body portion 91 covers a portion of the outer circumferential surface of the first path restricting member 40 in the circumferential direction of the first path restricting member 40. For example, the second main body portion 91 covers a portion of the outer circumferential surface of the first main body portion 43 of the connecting portion 49 in the circumferential direction of the wire harness main body 11. For example, the horizontal cross-sectional shape of the second main body portion 91 is a shape that matches the outer surface of the first main body portion 43. For example, the horizontal cross-sectional shape of the second main body portion 91 is an arc shape or a U shape.

As shown in FIG. 6, the second main body portion 91 is provided with a second insertion port 91X that is open in a direction orthogonal to the lengthwise direction of the second main body portion 91. The second insertion port 91X extends over the full length of the second main body portion 91 in the lengthwise direction of the second main body portion 91. The opening width of the second insertion port 91X is equal to the outer diameter of the first path restricting member 40, or larger than the outer diameter of the first path restricting member 40, for example. The exterior member 30 and the first path restricting member 40 are inserted into the second insertion port 91X in a direction orthogonal to the lengthwise direction of the second main body portion 91.

For example, the lid portion 92 includes a lid main body portion 93 that covers a portion of the outer circumferential surface of the connecting portion 49, and an extension portion 94 that is provided at one end of the lid main body portion 93 in the circumferential direction thereof. For example, the horizontal cross-sectional shape of the inner surface of the lid main body portion 93 is a shape that matches the outer surfaces of the exterior member 30 and the first path restricting member 40. For example, the horizontal cross-sectional shape of the inner surface of the lid main body portion 93 is formed in an arc shape or an ellipsoidal arc shape. The extension portion 94 is provided with a communication hole 95 that can communicate with the fixing hole 82 in the fixing portion 81. The extension portion 94 is provided with claw portions 96 that can engage with the lock portions 83 of the fixing portion 81.

For example, the lid portion 92 is coupled to the second main body portion 91, using a hinge portion 97. Specifically, the other end portion of the second main body portion 91 in the circumferential direction thereof and the other end portion of the lid main body portion 93 of the lid portion 92 in the circumferential direction thereof are coupled to each other, using the hinge portion 97. The second main body portion 91 and the lid portion 92 are formed integrally with each other so as to be an integrated part with the hinge portion 97 being interposed therebetween.

The second main body portion 91 and the lid portion 92 are rotatable about the hinge portion 97 relative to each other. The lid portion 92 is rotatable about the hinge portion 97, which serves as an axis, between the open position shown in FIG. 6 and the closed position shown in FIG. 7. As shown in FIG. 7, when the lid portion 92 is at the closed position, the claw portions 96 of the extension portion 94 are caught on the lock portions 83 of the fixing portion 81. As a result of the claw portions 96 and the lock portions 83 engaging with each other, the lid portion 92 is held at the closed position. Thus, the second main body portion 91 and the lid portion 92 are coupled to each other. In the state where the second main body portion 91 and the lid portion 92 are coupled to each other, the covering portion 90 is formed in an annular shape that collectively encloses the exterior member 30 and the connecting portion 49. That is to say, the lid portion 92 is rotated relative to the second main body portion 91 and is held at the closed position, and thus the lid portion 92 can enclose and hold the first path restricting member 40 and the wire harness main body 11 together with the second main body portion 91. As shown in FIG. 5, when the lid portion 92 is at the closed position, the communication hole 95 provided in the extension portion 94 communicates with the fixing hole 82 of the fixing portion 81.

The fixing member 80 is fixed to the vehicle body V1 in a state where the outer surface of the lid portion 92 faces toward the attachment surface V2 of the vehicle body V1. For example, the fixing member 80 is fixed to the vehicle body V1 in a state where the outer surface of the lid portion 92 is in contact with the attachment surface V2. For example, the attachment surface V2 is provided with a fixing piece V3 that extends in a direction orthogonal to the attachment surface V2 toward the ground (downward in the figure). As a result of the fixing piece V3 penetrating through the communication hole 95 and the fixing hole 82 to engage with an edge portion or the like of the fixing hole 82, the fixing member 80 is fixed to the attachment surface V2.

As shown in FIG. 7, the covering portion 90 has protruding portions 98 that serve as a second engaging portion. The covering portion 90 in the present embodiment has two protruding portions 98. The protruding portions 98 are formed so as to be able to respectively engage with the recessed portions 48 in the circumferential direction of the wire harness main body 11. For example, the protruding portions 98 are provided on the inner surface of the second main body portion 91. For example, the protruding portions 98 protrude from the inner surface of the second main body portion 91 toward the first main body portion 43 of the connecting portion 49. For example, the protruding portions 98 are formed so as to be able to be respectively fitted into the recessed portions 48 through recess-protrusion fitting. For example, the protruding portions 98 each have a curved horizontal cross-sectional shape. For example, the protruding portions 98 each have a semicircular horizontal cross-sectional shape.

For example, as shown in FIG. 6, the protruding portions 98 each extend in the lengthwise direction of the wire harness main body 11. The protruding portions 98 are each formed so as to be longer in the lengthwise direction of the wire harness main body 11 than in the circumferential direction of the wire harness main body 11. For example, each protruding portion 98 is formed so that the size thereof in the circumferential direction of the wire harness main body 11 is twice or more as large as the size thereof in the lengthwise direction of the wire harness main body 11. For example, the protruding portions 98 each extend in the full length of the covering portion 90 in the lengthwise direction thereof. For example, the protruding portions 98 are provided on a portion of the second main body portion 91 in the circumferential direction thereof.

As shown in FIG. 7, when the protruding portions 98 are fitted into the recessed portions 48 through recess-protrusion fitting, the recessed portions 48 and the protruding portions 98 engage with each other in the circumferential direction of the wire harness main body 11. Specifically, when the protruding portions 98 are fitted into the recessed portions 48 through recess-protrusion fitting, the inner surfaces of the recessed portions 48 and the side surfaces of the protruding portions 98 engage with each other in the circumferential direction of the wire harness main body 11. As a result, the first path restricting member 40 and the fixing member 80 are less likely to move relative to each other in the circumferential direction of the wire harness main body 11. As a result, the first path restricting member 40 is prevented from rotating in the circumferential direction of the wire harness main body 11 in the covering portion 90 of the fixing member 80. Also, when the protruding portions 98 are fitted into the recessed portions 48, the first path restricting member 40 is positioned with respect to the covering portion 90 in the circumferential direction of the wire harness main body 11. As a result, the orientation of the first path restricting member 40, specifically the orientation of the first insertion port 40X, is adjusted with respect to the covering portion 90 in the circumferential direction of the wire harness main body 11. In other words, the position of the first insertion port 40X in the first path restricting member 40 in the circumferential direction thereof is determined by the recessed portions 48 and the protruding portions 98 engaging with the recessed portions 48. In the present embodiment, when the protruding portions 98 are fitted into the recessed portions 48, the position of the first insertion port 40X in the first path restricting member 40 in the circumferential direction thereof is set so as to face toward the lid portion 92 of the covering portion 90. Therefore, in a state where the connecting portion 49 is fitted into the covering portion 90, the first insertion port 40X faces toward the attachment surface V2 (see FIG. 5), and the first insertion port 40X faces the opposite side of the ground.

As shown in FIG. 5, for example, the wire harness 10A includes restricting members 71 that restrict the first path restricting member 40 from moving with respect to the exterior member 30. For example, the restricting members 71 are provided at two end portions of the first path restricting member 40 in the lengthwise direction thereof.

Next, actions of the present embodiment will be described.

By using the fixing member 80 to hold the first path restricting member 40 attached to the exterior member 30 to fix the fixing member 80 to the vehicle body V1, it is possible to fix the exterior member 30 and the first path restricting member 40 to the vehicle body V1. Here, the recessed portions 48 are provided in the first main body portion 43 of the connecting portion 49 of the first path restricting member 40. Also, the covering portion 90 of the fixing member 80 is provided with the protruding portions 98 that engage with the recessed portions 48 in the circumferential direction of the wire harness main body 11. As a result of the recessed portions 48 and the protruding portions 98 engaging with each other, the first path restricting member 40 is prevented from moving in the circumferential direction of the wire harness main body 11 relative to the fixing member 80.

The above-described embodiment can achieve similar effects as the first embodiment.

OTHER EMBODIMENTS

The above embodiments can be modified and implemented as follows. The above embodiments and the following modifications can be implemented in combination with each other as long as no contradiction arises.

In the above embodiments, the shape, formation position, and number of the recessed portions 48 that serve as the first engaging portion and the protruding portions 68 and 98 that serve as the second engaging portion can be changed as appropriate. For example, as long as the first engaging portion and the second engaging portion have structures for engaging with each other in the circumferential direction of the wire harness main body 11, other structures are not particularly limited.

The number of recessed portions 48 provided in the connecting portions 47 and 49 may be one or three or more. —Similarly, the number of protruding portions 68 and 98 provided on the covering portions 60 and 90 may be one or three or more.

Although the protruding portions 68 are provided on the inner surface of the covering main body portion 61 in the above-described first embodiment, the present disclosure is not limited to such a configuration, and the protruding portions 68 may be provided on the inner surface of the lid portion 62. If this is the case, for example, when the protruding portions 68 provided on the inner surface of the lid portion 62 is fitted into the recessed portions 48 of the first path restricting member 40 through recess-protrusion fitting, the position of the first insertion port 40X of the first path restricting member 40 in the circumferential direction thereof is determined so that the first insertion port 40X faces toward the covering main body 61 of the covering portion 60. Similarly, the protruding portions 98 in the above-described second embodiment may be provided on the inner surface of the lid main body portion 93.

In the above-described embodiments, the first engaging portion is provided as the recessed portions 48 and the second engaging portion is provided as the protruding portions 68 and 98, and the first engaging portion and the second engaging portion engage with each other through recess-protrusion fitting. However, the recess-protrusion relationship thereof may be the other way around. If this is the case, for example, protruding portions that serve as first engaging portions that protrude from the outer surface of the connecting portion 47 are provided on the first main body portion 43, and recessed portions that serve as second engaging portions that fit onto the protruding portions through recess-protrusion fitting are provided in the covering portions 60 and 90.

In the above-described embodiments, the first engaging portion that engages with the protruding portions 68 and 98 is provided as the recessed portions 48 that do not penetrate through the first path restricting member 40 in a radial direction thereof. However, the present disclosure is not limited to such a configuration. For example, the first engaging portion may be provided as through holes that penetrate through the first path restricting member 40 in a radial direction thereof.

In the above-described embodiments, the recessed portions 48 are formed so as to extend over the full length of the first main body portion 43 in the lengthwise direction thereof. However, the present disclosure is not limited to such a configuration. For example, the recessed portions 48 may be provided over a portion of the first main body portion 43 in the lengthwise direction thereof. For example, the recessed portions 48 may be provided only on the connecting portions 47 and 49 of the first main body portion 43 in the lengthwise direction thereof.

In the above-described embodiments, the recessed portions 48 are formed so as to extend over the full length of the connecting portion 47 and 49 in the lengthwise direction thereof. However, the present disclosure is not limited to such a configuration. For example, the recessed portions 48 may be provided in portions of the connecting portions 47 and 49 in the lengthwise direction thereof.

In the above-described embodiments, the recessed portions 48 are formed so as to continuously extend in the lengthwise direction of the connecting portions 47 and 49. However, the present disclosure is not limited to such a configuration. For example, the recessed portions 48 may be provided so as to intermittently extend in the lengthwise direction of the connecting portions 47 and 49. That is to say, the recessed portions 48 may be provided at predetermined intervals on portions of the connecting portions 47 and 49 in the lengthwise direction thereof.

In the above-described embodiments, the protruding portions 68 and 98 are formed so as to extend over the full length of the covering portion 60 and 90 in the lengthwise direction thereof. However, the present disclosure is not limited to such a configuration. For example, the protruding portions 68 and 98 may be provided on portions of the covering portions 60 and 90 in the lengthwise direction thereof.

In the above-described embodiments, the protruding portions 68 and 98 may be provided so as to intermittently extend in the lengthwise direction of the covering portions 60 and 90.

In the above-described embodiments, a configuration in which the first engaging portion and the second engaging portion are fitted to each other through recess-protrusion fitting is embodied. However, the present disclosure is not limited to such a configuration. For example, both the first engaging portion and the second engaging portion may be protruding portions as long as the first engaging portion and the second engaging portion are configured to be able to engage with each other in the circumferential direction of the wire harness main body 11.

In the above-described first embodiment, second path restricting members 50 may be respectively provided on both sides in the lengthwise direction of the first path restricting member 40. If this is the case, connecting portions 47 that each have the recessed portions 48 may be respectively provided at the two end portions of the first path restricting member 40 in the lengthwise direction, for example.

The configuration of the first path restricting member 40 in the above-described embodiments may be changed as appropriate. For example, as long as the first path restricting member 40 has the first main body portion 43 and the first insertion port 40X and is configured to be attachable to the outer circumferential surface of the exterior member 30, other configurations are not specifically limited.

In the above-described embodiments, the second protruding portions 46 are provided on the inner surface of the portion of the first main body portion 43 in the circumferential direction thereof where the recessed portions 48 are formed. However, the present disclosure is not limited to such a configuration. For example, the second protruding portions 46 and the recessed portions 48 may be located so as to be shifted from each other in the circumferential direction of the first main body portion 43.

The second protruding portions 46 may be provided on a portion of the first path restricting member 40 in the lengthwise direction thereof.

At least one of the two second protruding portions 46 may be omitted.

The first protruding portions 45 may be provided further away from the first insertion port 40X than the leading ends 41A and 42A in the circumferential direction of the first path restricting member 40.

The first protruding portions 45 may be provided on a portion of the first path restricting member 40 in the lengthwise direction thereof.

At least one of the two first protruding portions 45 may be omitted.

The thickness of the first main body portion 43 in a radial direction thereof may be configured to vary in the circumferential direction thereof.

The first path restricting member 40 is not limited to being provided under the floor of the vehicle V. The first path restricting member 40 may be provided inside the vehicle V, for example, as long as the first path restricting member 40 is a straight section of the path of the wire harness main body 11.

The configuration of the second path restricting member 50 in the above-described first embodiment may be changed as appropriate. For example, as long as the second path restricting member 50 has the second engaging portion that can engage with the first engaging portion, and the covering portion 60 that covers the connecting portion 47, other configurations are not particularly limited.

In the second path restricting member 50, the second main body portion 51 and the lid portion 62 are formed integrally with each other. However, the present disclosure is not limited to such a configuration, and the second main body portion 51 and the lid portion 62 may be separated. That is to say, the second main body portion 51 and the lid portion 62 may be separate parts.

The lid portion 62 of the second path restricting member 50 may be omitted.

The bent shape of the second main body portion 51 may be changed as appropriate. For example, the bent shape of the second main body portion 51 may be changed to a straight shape.

The second path restricting member 50 may be provided with a lid portion that is coupled to the second main body portion 51 other than the covering main body portion 61.

At least either one of the restricting members 71 and 72 in the above-described first embodiment may be omitted.

In the above-described first embodiment, the first path restricting member 40 and the second path restricting member 50 are more rigid than the exterior member 30. However, the present disclosure is not limited to such a configuration, and the first path restricting member 40 and the second path restricting member 50 may be as rigid as the exterior member 30, or less rigid than the exterior member 30. That is to say, as long as the first path restricting member 40 and the second path restricting member 50 make the wire harness main body 11 less bendable than when the first path restricting member 40 and the second path restricting member 50 are not attached to the wire harness main body 11, the first path restricting member 40 and the second path restricting member 50 do not necessarily have to be more rigid than the exterior member 30.

The configuration of the fixing member 80 in the above-described second embodiment may be changed as appropriate. For example, as long as the fixing member 80 has the second engaging portion that can engage with the first engaging portion, and has a configuration that is provided with the covering portion 90 that covers the connecting portion 49, other configurations are not particularly limited.

In the covering portion 90, the second main body portion 91 and the lid portion 92 are formed integrally with each other. However, the present disclosure is not limited to such a configuration, and the second main body portion 91 and the lid portion 92 may be separated. Note that even in the case where the second main body portion 91 and the lid portion 92 are separate parts, the lid portion 92 needs to be able to be coupled to the second main body portion 91, and needs to be able to enclose and hold the first path restricting member 40 together with the second main body portion 91 in the state of being coupled to the second main body portion 91.

Although the covering portion 90 above has the second main body portion 91 and the lid portion 92 and can be retrofitted to the first path restricting member 40, the present disclosure is not limited to such configuration. For example, the covering portion 90 may be configured to be unable to move when the lid portion 92 is in the closed state. If this is the case, the fixing member 80 cannot be retrofitted to the first path restricting member 40, specifically the fixing member 80 cannot be attached in a direction orthogonal to the lengthwise direction of the first path restricting member 40, and the first path restricting member 40 needs to be attached to the fixing member 80 in the lengthwise direction thereof.

The configuration of the fixing portion 81 may be changed as appropriate. For example, the fixing member 80 in the above-described second embodiment is configured to be fixed to the vehicle body V1 using the fixing piece V3 that extends from the attachment surface V2 toward the ground. However, the present disclosure is not limited to such a configuration, and the fixing member 80 may be fixed using another configuration. For example, the fixing member 80 may be configured to be fixed to the attachment surface V2 using another attaching bracket. For example, the fixing member 80 may have an attachment portion that is to be attached to an attachment hole formed in the attachment surface V2, and to be fixed to the attachment surface V2 when the attachment portion is fitted into the attachment hole.

Although the fixing member 80 above is configured to be fixed to the vehicle body V1 such that the outer surface of the lid portion 92 of the covering portion 90 faces the attachment surface V2. However, the present disclosure is not limited to such a configuration. For example, the fixing member 80 may be configured to be fixed to the vehicle body V1 such that the outer surface of the second main body portion 91 of the covering portion 90 faces the attachment surface V2.

In the above-described second embodiment, two or more fixing members 80 may be provided in the lengthwise direction of the first path restricting member 40.

In the above-described first embodiment, the second path restricting member 50 is embodied as an attaching member that has the covering portion 60. However, the present disclosure is not limited to such a configuration. For example, a structure that is only provided with the covering portion 60 may be embodied as the attaching member.

In the above-described second embodiment, the fixing member 80 is embodied as an attaching member that has the covering portion 90. However, the present disclosure is not limited to such a configuration. For example, a structure that is only provided with the covering portion 90 may be embodied as the attaching member.

At least either one of the two restricting members 71 in the above-described second embodiment may be omitted.

For example, the exterior member 30 may be a resin corrugated tube with a metal layer that contains a metal material, formed on the outer surface thereof.

The exterior member 30 is not limited to being a corrugated tube, and may be an exterior member that is not provided with an annular protrusion 31 or an annular recess 32, for example.

The exterior member 30 may have a slit that extends in the lengthwise direction of the exterior member 30.

Although the above electric wires 21 are high-voltage electric wires, the present disclosure is not limited to such a configuration. For example, the electric wires 21 may be low-voltage electric wires.

In the electric wire member 20, the electromagnetic shield member is embodied as the braided member 25. However, the present disclosure is not limited to such a configuration, and the electromagnetic shield member may be configured as a piece of metal foil.

The braided member 25 of the electric wire member 20 may be omitted.

The number of electric wires 21 included in the above electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiments, and may be changed as appropriate depending on the vehicle configuration.

A plurality of on-board devices to which the wire harness 10 or 10A is to be electrically connected are embodied above as the inverter M1 and the high-voltage battery M2. However, the present disclosure is not limited to such a configuration. The plurality of on-board devices to which the wire harness 10 or 10A is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:
a wire harness main body that includes an electric wire and an exterior tube that encloses an outer circumferential surface of the electric wire;
a path restricting member that is attached to an outer circumferential surface of the exterior tube; and
an attaching member that is attached to an outer circumferential surface of a connecting portion of the path restricting member, wherein:
the path restricting member includes a first main body that covers a portion of the outer circumferential surface of the exterior tube, and a first insertion port that is open in a direction orthogonal to a lengthwise direction of the first main body and extends over a full length of the first main body in a lengthwise direction of the first main body,
the attaching member includes a cover that covers the outer circumferential surface of the connecting portion,
the connecting portion includes a first engagement that is provided in the first main body,
the cover includes a second engagement that engages with the first engagement in a circumferential direction of the wire harness main body,
the path restricting member and the attaching member both have a curved shape, with a longitudinal direction of the first and second engagements both extending in a lengthwise direction,
restricting members are placed at ends of the path restricting member and the attaching member that are opposite to where the path restricting member and the attaching member are attached, a diameter of the wire harness main body is greater than a width of the first insertion port, the path restricting member is provided with first protrusions that protrude from an inner surface of a first end and a second end of the first main body, have a longitudinal direction that extends in the lengthwise direction, and are in contact with the outer surface of the wire harness main body, and the path restricting member is provided with a second protrusion that is circumferentially spaced from the first protrusions, protrudes from the inner surface of the first main body, has a longitudinal direction that extends in the lengthwise direction, and comes into contact with the wire harness main body.

2. The wire harness according to claim 1, wherein:
either one of the first engagement and the second engagement is a recess, and
the other of the first engagement and the second engagement is a protrusion that fits into the recess through a recess-protrusion fitting.

3. The wire harness according to claim 1, wherein:
the first engagement extends in the lengthwise direction of the wire harness main body, and
the second engagement extends in the lengthwise direction of the wire harness main body.

4. The wire harness according to claim 3, wherein:
the first engagement extends over a full length of the connecting portion in a lengthwise direction thereof, and
the second engagement extends over a full length of the cover in the lengthwise direction thereof.

5. The wire harness according to claim 1, wherein:
the first engagement is a recess provided in an outer surface of the first main body,
the second engagement is a protrusion that protrudes from an inner surface of the attaching member toward the path restricting member, and that engages with the recess through a recess-protrusion fitting, and
the recess does not penetrate the first main body.

6. The wire harness according to claim 5, wherein the second protrusion protrudes from the inner surface of a portion of the first main body where the recess is provided.

7. The wire harness according to claim 1, wherein:
when the path restricting member is defined as a first path restricting member,
the attaching member is a second path restricting member that is attached to the outer circumferential surface of the exterior tube,
the connecting portion is provided at an end of the first path restricting member in the lengthwise direction thereof, and
the cover is provided at an end of the second path restricting member in the lengthwise direction of the second path restricting member.

8. The wire harness according to claim 7, wherein:
the first path restricting member is placed on a straight section that is a straight section included in the path of the wire harness main body, and
the second path restricting member is placed on a path of a bend that is a bent section included in the path of the wire harness main body.

9. The wire harness according to claim 1,
wherein the attaching member is a fixing member that includes the cover that encloses and holds the wire harness main body and the path restricting member, and a fixing portion that is coupled to the cover and is to be fixed to a vehicle body.

10. The wire harness according to claim 7, wherein:
the cover is formed in an annular shape that encloses an entirety of the outer circumferential surface of the connecting portion and an entirety of an outer circumferential surface of a portion of the exterior tube to which the connecting portion is attached, in a circumferential direction, and
the cover includes a second main body and a lid that is coupled to the second main body.

* * * * *